United States Patent
Huber et al.

(10) Patent No.: US 9,085,364 B2
(45) Date of Patent: Jul. 21, 2015

(54) LOCKING ELEMENT

(75) Inventors: Thomas Huber, Schliersee (DE);
Richard Holzner, Stephanskirchen (DE)

(73) Assignee: Telair International GmbH (DE)

( * ) Notice: Subject to any disclaimer, the term of this patent is extended or adjusted under 35 U.S.C. 154(b) by 776 days.

(21) Appl. No.: 13/379,989

(22) PCT Filed: Jun. 22, 2009

(86) PCT No.: PCT/EP2009/004485
§ 371 (c)(1),
(2), (4) Date: Jan. 31, 2012

(87) PCT Pub. No.: WO2010/149180
PCT Pub. Date: Dec. 29, 2010

(65) Prior Publication Data
US 2012/0126058 A1    May 24, 2012

(51) Int. Cl.
B60P 7/08    (2006.01)
B64D 9/00    (2006.01)
B60P 7/13    (2006.01)

(52) U.S. Cl.
CPC .. B64D 9/003 (2013.01); B60P 7/13 (2013.01)

(58) Field of Classification Search
CPC ............ B60P 3/00; B60P 7/08; B60P 7/0807; B60P 7/0892; B60P 7/10; B60P 7/13; B64D 9/003
USPC ................. 410/77, 79, 80, 69, 91; 244/118.1, 244/137.1; 248/503
See application file for complete search history.

(56) References Cited

U.S. PATENT DOCUMENTS

| 4,349,168 A | 9/1982 | Barnes et al. |
| 4,372,715 A | 2/1983 | Naffa |
| 4,401,286 A | 8/1983 | Naffa |
| 7,665,938 B2 * | 2/2010 | Schulze .......................... 410/80 |

FOREIGN PATENT DOCUMENTS

| EP | 0 771 726 A2 | 5/1997 |
| EP | 0 771 726 A3 | 11/1997 |

OTHER PUBLICATIONS

International Search Report for International Application No. PCT/EP2009/004485 dated Apr. 27, 2010.

* cited by examiner

*Primary Examiner* — Stephen Gordon
(74) *Attorney, Agent, or Firm* — Barnes & Thornburg LLP

(57) ABSTRACT

A locking element is described for securing containers, pallets or similar freight items in the cargo bay of an aircraft, wherein a first and a second locking claw are mounted on a frame swivellable from a lowered loading position into a raised working position for securing containers. A remotely controllable adjustment device is provided to change and adjust the state of the locking claws between the loading state in which the locking claws are in the loading position, a holding state in which the locking claws are in the working position and fixed, and a trigger state in which the locking claws are in the working position but can be swivelled from the working position into the loading position if a force acting on the locking claws exceeds a predetermined amount.

11 Claims, 3 Drawing Sheets

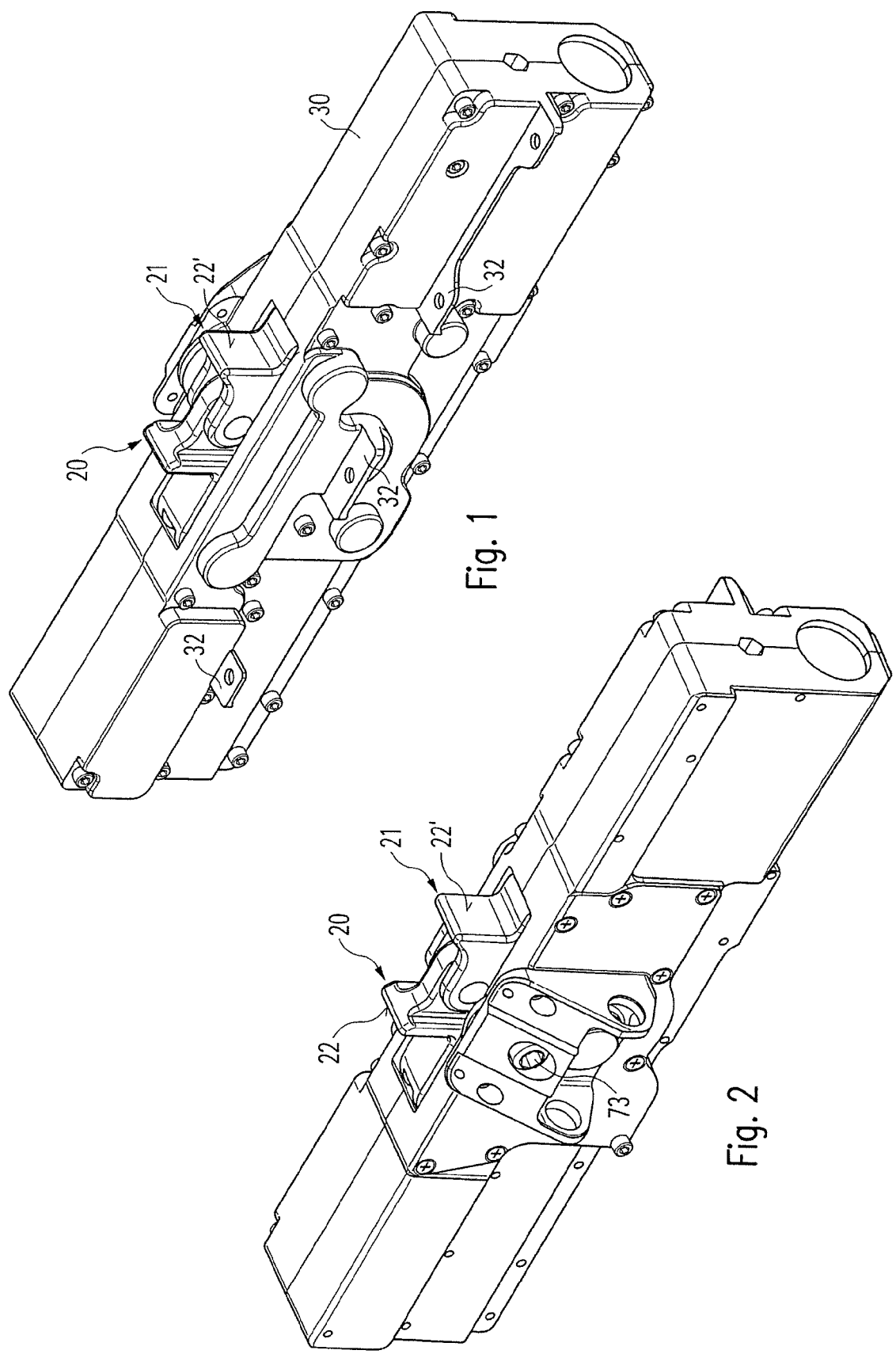

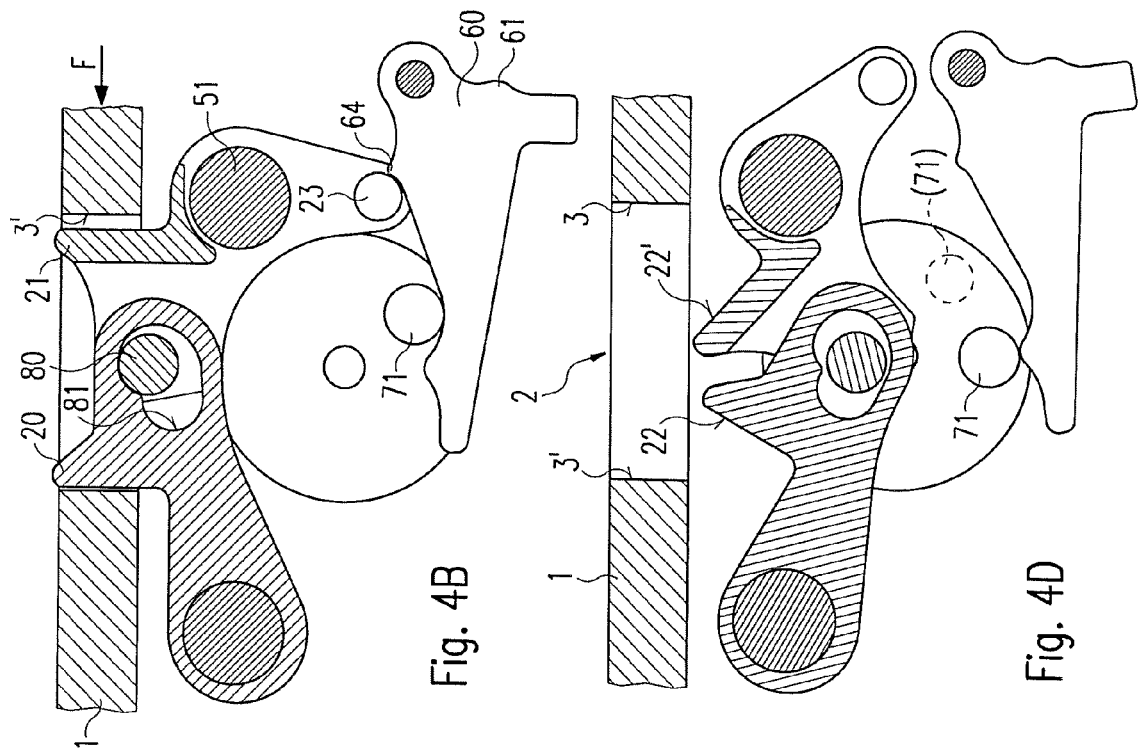
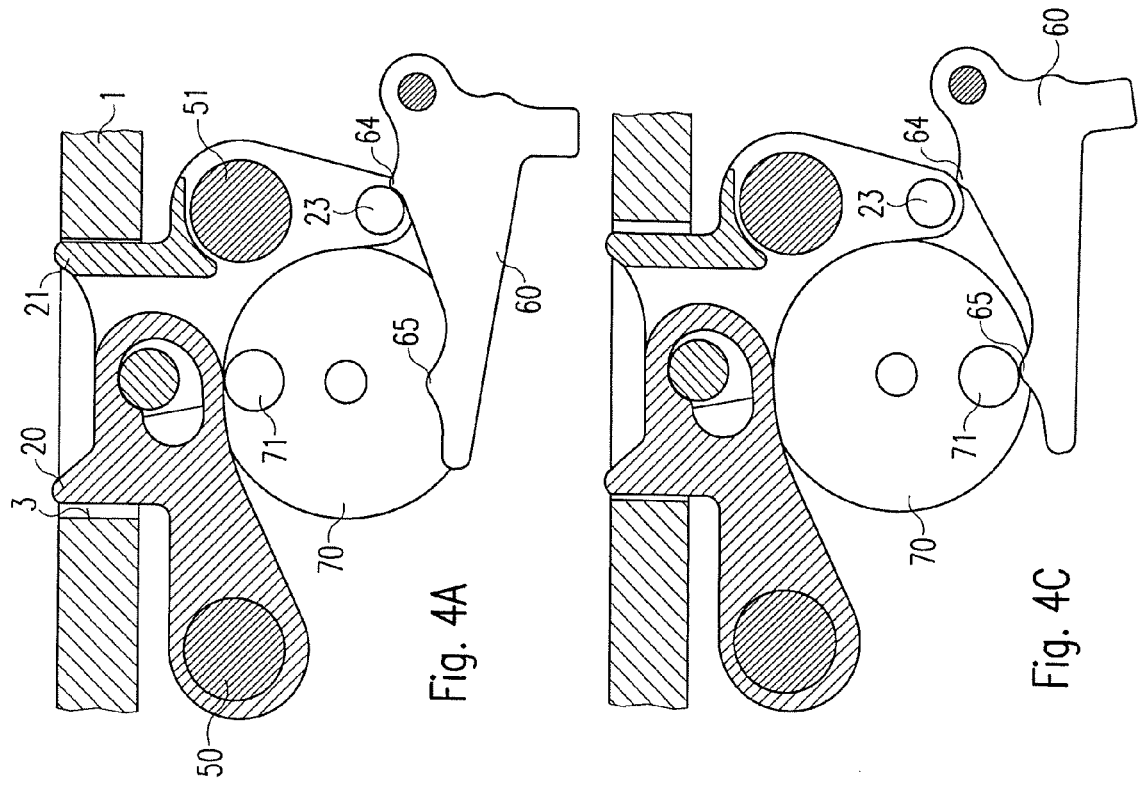

LOCKING ELEMENT

CROSS-REFERENCE TO RELATED APPLICATIONS

This application claims priority to, and is a National Phase application of, pending PCT/EP2009/004485 entitled, Locking Element, filed Jun. 22, 2009, the disclosure of which is hereby incorporated by reference in its entirety.

FIELD OF THE INVENTION

The invention concerns a locking element for securing containers or similar freight in a cargo bay of an aircraft.

BACKGROUND OF THE INVENTION

To transport air freight, the items of freight to be transported, in particular containers or pallets produced to particular standards, are attached inside the cargo bay by means of locking elements on the floor of the cargo bay.

In the military freight sector there is a particular standard, according to which containers or pallets have recesses on the edges at regular intervals in which hook-shaped locking elements can engage to hold the containers in the x direction i.e. the longitudinal direction of the aircraft. These hooks are formed swivellable in the plane of the cargo bay i.e. the x-y plane.

Such locking elements are particularly critical if during a flight, freight must be unloaded via parachute. In this case, when the rear loading hatch is opened and the freight is to be extracted via a parachute previously ejected from the cargo bay, the locking elements must open reliably otherwise there is a danger of crashing, in particular from low altitude. Some embodiments in accordance with the invention create a locking element of the type cited initially such that the locks are reliably releasable.

A locking element for securing containers or similar freight in the cargo bay of an aircraft in the longitudinal direction may be provided. The locking element may include: a frame, a first and a second locking claw which are mounted on the frame swivellable about a first or a second swivel axis from a lowered loading position to a raised working position in order to secure the container, wherein a remotely controllable adjustment device is provided to change and adjust the state of the locking claws between a loading state in which the locking claws are in the loading position (retracted/released), a holding state (locked) in which the locking claws are in the working position and fixed, and a trigger state (armed) in which the locking claws are in the working position but can be swivelled out of the working position into the loading position when a force acting on the locking claws in the longitudinal direction exceeds a predetermined amount.

In some embodiments as the conventional positions ("loading position" and "working position") in which the locking claws are retracted such that containers can be moved over the locks (loading position) or the locks engage in the recesses of the containers (working position), a third lock position is provided. In this third lock position the containers are still secured, but on application of a sufficiently large force by the container itself they can be lowered to the loading position so that the containers are now free.

This ensures that when the parachute opens, the freight can be safely extracted from the cargo bay.

Furthermore it is possible to move the locking claws from the holding state (locked) directly into the loading position (retracted/released). This function is used in particular when the load must simply roll out (i.e. without any parachute) on command at low altitude by raising the aircraft nose by around 4°. This is known as the gravity drop method.

Preferably this predetermined amount of force differs depending on whether it is acting in one or the opposite direction. Such a locking element can be mounted in the cargo bay such that forces which act on the flight direction, such as occur during deceleration of the aircraft, practically do not lower the locking claws while forces which act in the unloading direction cause the locking claws to lower.

The locking elements can be formed such that the locking claws are mobile in the plane of the cargo bay floor in the normal manner. Preferably the locking element is formed such that it can be mounted in a plane perpendicular to this. The locking claws are therefore swivelled in an x-z plane i.e. a plane running perpendicular to the cargo bay floor.

Preferably the two locking claws each have a stop surface which can be brought to rest on stop edges of recesses of the containers when the containers are locked. The locking claws here are formed mobile such that the two stop surfaces move away from the stop edges when moving out of the working position into the loading position. This ensures that the lock can be opened even if a container has moved during flight and is lying closely against one (or both) stop surfaces with its stop edges.

The stop surfaces are preferably attached to the swivellable locking claws such that in the working position they are arranged parallel and aligned to each other. This guarantees optimum holding of the containers and at the same time easy release from the locking position.

For definition of the predetermined amount of force which when exceeded swivels the locking claws from the working position to the loading position, preferably a spring device is provided. This is a reliable means which is easy to produce. Preferably in this arrangement, a tensioning device is provided which can be adjusted in particular by electric motor and which allows setting of the pretension of a retaining spring. As a result it is possible to adjust each lock in the cargo bay to the freight it must retain and release when the predetermined force is exceeded. As a result freight weighing half a tonne can be released with a low force acting on the locking claws in the same way as freight weighing ten tonnes.

The locking claws preferably have a movement spring element which pretensions the locking claws from the working position into the loading position. This achieves a reliable release of the load.

The two locking claws are preferably connected together rotating in opposing directions such that movement of the one locking claw carries with it the other locking claw. This leads to a simpler overall design of the arrangement.

Preferably the adjustment device comprises a securing lever which can be swivelled from an upper securing position for securing the claws into a lower release position in which the securing lever releases the claws. Such a lever mechanism is simple to construct.

The adjustment device furthermore comprises preferably a cam plate which is rotatable such that it can be moved into the following three positions: 1) a holding position for fixing the locking claws in the working position (locked), 2) a trigger position for releasing the locking claws in the working position (armed), and 3) a loading position for swivelling the locking claws into the loading position (released).

This trigger position is the third position mentioned initially in which the locking claws are indeed in the working position but can be lowered when a predetermined force is applied. The setting of the positions by means of the cam plate constitutes a reliable and tested method.

A cargo bay floor is also claimed to which locking elements of the types described are mounted. Such a cargo bay floor is particularly suitable for unloading freight e.g. military goods or accessories during flight via a rear hatch.

Furthermore some embodiments of the invention may concern a method for unloading containers or similar freight from the cargo bay of an aircraft, wherein the containers or similar freight are secured with locking elements of the type cited initially, the may include: setting the trigger state of the locking claws to secure the container, loading the locking claws in the unloading direction with a force exceeding the predetermined amount in order to release the containers, and moving the containers out of the cargo bay.

This movement of the containers takes place preferably via a parachute device previously ejected.

BRIEF DESCRIPTION OF THE DRAWINGS

An embodiment example of the invention is described in more detail below with reference to drawings. These show:

FIG. 1 a perspective view of a locking element according to one embodiment of the invention;

FIG. 2 the locking element according to FIG. 1 from the other side;

FIGS. 4A-4D a principle depiction of the locking element in its various positions.

DETAILED DESCRIPTION

Figure 3:
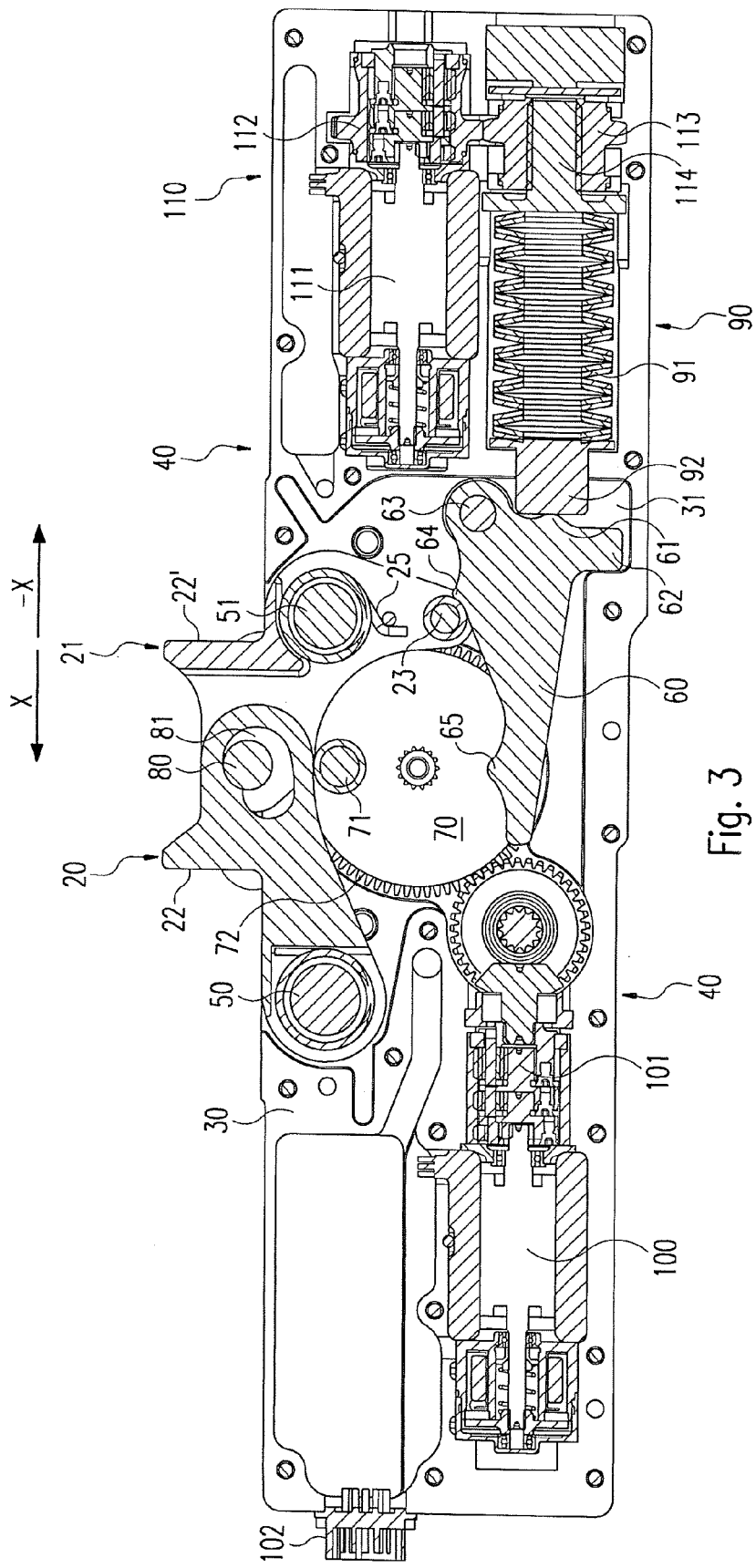
FIG. 3 a part longitudinal section of the locking element according to FIGS. 1 and 2.

In the description below the same reference numerals are used for the same parts and those with similar effect.

FIGS. 1 and 2 show an embodiment of the locking element according to the invention in perspective view from two sides. These depictions show that the locking element has a frame 30 comprising two half-shells connected together. Fixing tabs 32 are provided to attach the frame 30 and hence the entire locking element to a cargo bay floor.

Locking claws 20, 21 are mounted swivellably in the frame 30, as will be described in more detail below. These locking claws 20, 21 each have stop surfaces 22, 22' which come to rest on stop edges 3, 3' (see FIGS. 4A-4D) of a recess 2 of a container 1 when the container is locked.

For mechanical (supporting) activation of the arrangement i.e. for lowering the locking claws 20, 21, a control element 73 is provided which in the embodiment shown here is formed as a socket head.

As shown in FIG. 3, the locking claws 20, 21 are mounted swivellably on swivel axes 50, 51 in frame 30. A spring 25 is provided as a movement spring element which acts counter-clockwise on the locking claws 21 in FIG. 3. A corresponding spring (not shown) is provided for lowering the locking claws 20.

The two locking claws 20, 21 are connected together via a connecting pin 80 (on locking claw 21) and a recess as a connecting slide 81 (on the other locking claw 20) in order to transfer a rotary movement of locking claw 21 to locking claw 20.

Furthermore a cam plate 70 is mounted rotatably in the frame 30 which on its outer periphery has a crown gear 72 connected rotationally stationary with electric motor 100 via a gear 101. The cam plate 70 can be turned via said control element 73 wherein the rotor of the electric motor 100 is also turned.

The cam plate 70 has an adjustment cam 71, the precise function of which will be explained below with reference to FIG. 4.

A securing lever 60 is also mounted swivellably on a lever bearing peg 63 in the frame 30. The securing lever 60 has a holding lug 64 and a release lug 65, the functions of which are described below.

Furthermore on the securing lever 60 is provided a limiting lug 62 which engages in a limiting recess 31 of frame 30 such that the swivel movement of the securing lever 60 is limited.

Furthermore a trigger spring element 90 is provided which has a retaining spring 91 with a thrust point 92 at the end that presses on a press stud 61 of the securing lever 60. The trigger spring element 90 furthermore comprises a spring adjustment device 110 containing an electric motor 111 which via a gear 112 is connected rotationally stationary with a spindle sleeve 113 that is mounted rotatably but linearly stationary in the frame 30. The spindle sleeve 113 sits on a spindle 114 which forms the bearing of the retaining spring 91 opposite the thrust point 92 of this retaining spring 91. When current is applied to the tensioning electric motor 111, the spindle sleeve 113 is turned so that the spindle 114 moves and the retaining spring 91 is tensioned (or released). Thus overall an electric adjustment device 40 is formed which comprises firstly the cam plate 70 rotatable by electric motor 100 with associated control elements and secondly the spring adjustment device 110.

The function of the embodiment of the locking element shown here is explained with reference to FIGS. 4A-4D in which the elements necessary to achieve the various states of the locking claws are shown.

FIG. 4A shows a holding state in which the locking claws 20, 21 are in the raised position and engage in the recess 2 of a container 1 such that the stop surfaces 22, 22' can come into contact with stop edges 3, 3' of recess 2. In this position the adjustment cam 71 supports the lower sections of locking claws 20, 21 so that these cannot rotate about their swivel axes 50, 51. In this holding state, the locking claws 20, 21 are fixed in the working position.

After activating electric motor 100 (and twisting the cam plate 70 clockwise) up to the position shown in FIG. 4B, there is no longer a direct support of locking claws 20, 21 by the adjustment cam 71. In this position which corresponds to the trigger state described initially, a retaining peg 23 connected with the right locking claw 21 (FIG. 4) is connected with the holding lug 64 of the securing lever 60. As a result the locking claw 21 is held in the raised working position. If now a force F acts on the locking claw 21 and attempts to twist this counter-clockwise, the retaining peg 23 exerts a torque on the securing lever 60 which also attempts to turn this counter-clockwise. This twist of the securing lever 60 is counteracted by the trigger spring element 90 since the thrust point 92 of the retaining spring 91 presses on the press stud 61 of the securing lever 60. If the force F is now sufficiently large, the pretensioned spring 91 is compressed and the securing lever 60 twisted counter-clockwise. If the twist is sufficiently large, the retaining peg 23 snaps over the holding lug 64 and locking claw 21 is swivelled down by the spring 25 (shown in FIG. 3). On this swivel movement, the connecting pin 80 also moves down (in a circular movement about swivel axis 51) and carries with it the other locking claw 20 by its stop in the connecting slide 81. This position is shown in FIG. 4D wherein the position of the adjustment cam 71 is shown as a dotted line. Force F at which the locking claws 20, 21 "drop down" can thus be adjusted by the trigger spring element 90.

If motor 100 is moved further so that the cam plate 70 turns further clockwise, the securing lever 60 is swivelled counter-clockwise against the force of the trigger release element 90 whereby the retaining peg 23 moves out of engagement with holding lug 64 (FIG. 4C). Spring 25 then swivels both locking claws 20, 21 together so that the position shown in FIG. 4D is reached in which the stop surfaces 22, 22' are out of engagement with stop edges 3, 3'.

The difference between the transition from FIG. 4B to FIG. 4D and that from FIG. 4C to FIG. 4D is that in the trigger state shown in FIG. 4B, a force F must act to swivel the securing lever 60 and release the retaining peg 23 from the holding lug 64, whereas the swivelling of the securing lever 60 on transition from FIG. 4C to FIG. 4D takes place by the electric motor 100 and no force need act on the locking claws 20, 21.

When the freight is to be unloaded using the "gravity drop" method in which the nose of the aircraft is raised by approximately 4° and the freight is moved with only low force, locking claws 20, 21 are brought (mechanically or electrically) by twisting the cam plate 70 out of the position shown in FIG. 4A to that in FIG. 4D (and beyond) i.e. from the working position (locked) into the loading position (retracted/released).

Furthermore by the construction of the locking element shown here and its description, it is clear that not only the force F shown in FIG. 4B acting on the right locking claw 21 can swivel the securing lever 60 and thus release the claws, but also a force (−F) acting in the opposite direction which acts on the locking claw 20. The different geometric conditions and the transfer of forces via the connecting pin 80 and connecting slide 81 however ensure that this force (−F) must be very much larger than the force (F) acting on the locking claw 20 to achieve the trigger state in which locking claws 20, 21 are lowered.

According to a further embodiment of the invention not shown here, the geometric conditions (lever arm, form of connecting slide) are selected such that the locking claws 20 cannot be lowered at all by a force −F acting on this. This is important to absorb the extreme loads occurring on a crash.

It is furthermore evident from FIG. 4 that the stop surfaces 22, 22' of the locking claws 20, 21 move closer together on lowering so that seizing in the recess 2 of the container 1 is practically impossible.

LIST OF REFERENCE NUMERALS

1 Container
2 Recess
3, 3' Stop edge
20 Locking claw
21 Locking claw
22, 22' Stop surface
23 Retaining peg
25 Movement spring element
30 Frame
31 Limiting recess
32 Fixing tab
40 Electric adjustment device
50 Swivel axis
51 Swivel axis
60 Securing lever
61 Press stud
62 Limiting lug
63 Lever bearing peg
64 Holding lug
65 Release lug
70 Cam plate
71 Adjustment cam
72 Crown gear
73 Control element
80 Connecting pin
81 Connecting slide
90 Trigger spring element
91 Retaining spring
92 Thrust point
100 Motor
101 Gear
102 Plug contact
110 Spring adjustment device
111 Tensioning electric motor
112 Gear
113 Spindle sleeve
114 Spindle

The invention claimed is:

1. A locking element for securing a container or freight in a cargo bay of an aircraft in its longitudinal direction (x), comprising;
   a frame, a first locking claw and a second locking claw which are mounted on the frame swivellable about a first and second swivel axis from a lowered loading position into a raised working position for securing the container or freight, wherein a remotely controllable adjustment device is provided to change and adjust the state of the locking claws between
   a loading state in which the locking claws are in the loading position,
   a holding state in which the locking claws are in the working position and fixed, and
   a trigger state in which the locking claws are in the working position but can be swivelled out of the working position into the loading position if a force (F) acting on the locking claws in the longitudinal direction (x) exceeds a predetermined amount,
   wherein the adjustment device comprises a cam plate that is rotatable such that the cam plate can be moved into the following three positions:
   a holding position for fixing the locking claws in the working position,
   a trigger position for releasing the locking claws in the working position, and
   a loading position for swivelling the locking claws into the loading position,
   the adjustment device comprising a spring device which defines the predetermined amount of the force (F) acting in the longitudinal direction (x), and a tensioning device which can be adjusted in particular by an electric motor for setting a pretension of a retaining spring.

2. The locking element according to claim 1, wherein the locking element is formed such that the predetermined force (F) differs depending on whether it is exerted in a first particular direction (x) or a second direction (−x) opposite the first direction, or swivelling of the locking claws into the loading position is completely prevented by a force (−F) acting in the second direction.

3. The locking element according to claim 1, wherein the locking claws each have a stop surface which can be brought to rest on stop edges of recesses of a container and that the locking claws are formed mobile such that the two stop surfaces move away from the stop edges on movement out of the working position into the loading position.

4. The locking element according to claim 3, in that in the working position, the stop surfaces are arranged parallel and aligned with each other.

5. The locking element according to claim 1, wherein a movement spring element is provided to swivel the locking claws out of the working position into the loading position.

6. The locking element according to claim 1, wherein the locking claws are connected together rotatable in opposite directions such that movement of the first locking claw carries with it the second locking claw.

7. The locking element according to claim 1, wherein the adjustment device comprises a securing lever which can be swivelled from an upper secured position for securing the locking claws into a lower release position in which the securing lever releases the locking claws.

8. The locking element according to claim 1, wherein the adjustment device comprises an electric motor.

9. A cargo bay floor of an aircraft, wherein the cargo bay comprises locking elements according to claim 1.

10. A method for unloading a container or freight from a cargo bay of an aircraft, wherein the container or freight is secured with locking elements according to claim 1, further comprising:
   triggering of the trigger state of the locking claws for securing the container or freight;
   loading the locking claws in an unloading direction (x) with a force (F) which exceeds the predetermined amount to release the container or freight, and
   moving the released container or freight out of the cargo bay.

11. A locking element for securing a container or freight in a cargo bay of an aircraft in its longitudinal direction (x), comprising;
   a frame, a first locking claw and a second locking claw which are mounted on the frame swivellable about a first and second swivel axis from a lowered loading position into a raised working position for securing the container or freight, wherein a remotely controllable adjustment device is provided to change and adjust the state of the locking claws between
   a loading state in which the locking claws are in the loading position,
   a holding state in which the locking claws are in the working position and fixed, and
   a trigger state in which the locking claws are in the working position but can be swivelled out of the working position into the loading position if a force (F) acting on the locking claws in the longitudinal direction (x) exceeds a predetermined amount,
   wherein the adjustment device comprises a cam plate that is rotatable such that the cam plate can be moved into the following three positions:
   a holding position for fixing the locking claws in the working position,
   a trigger position for releasing the locking claws in the working position, and
   a loading position for swivelling the locking claws into the loading position, wherein the adjustment device comprises an electric motor.

* * * * *